(12) United States Patent
Azzaretto et al.

(10) Patent No.: US 8,235,083 B2
(45) Date of Patent: Aug. 7, 2012

(54) PNEUMATIC TYRE FOR VEHICLE WHEELS

(75) Inventors: Riccardo Azzaretto, Milan (IT); Guido Daghini, Milan (IT); Daniele Arosio, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 694 days.

(21) Appl. No.: 12/308,470

(22) PCT Filed: Jun. 29, 2006

(86) PCT No.: PCT/IB2006/052183
§ 371 (c)(1),
(2), (4) Date: Dec. 16, 2008

(87) PCT Pub. No.: WO2008/001162
PCT Pub. Date: Jan. 3, 2008

(65) Prior Publication Data
US 2010/0269969 A1   Oct. 28, 2010

(51) Int. Cl.
*B60C 15/00* (2006.01)
(52) U.S. Cl. ........ 152/540; 152/539; 152/545; 152/550; 152/543
(58) Field of Classification Search .......... 152/539, 152/545, 550, 543, 540
See application file for complete search history.

(56) References Cited

U.S. PATENT DOCUMENTS

| | | |
|---|---|---|
| 2,501,372 A | 3/1950 | Benson |
| 2,966,933 A | 1/1961 | Boussu et al. |
| 3,072,171 A | 1/1963 | Drakeford et al. |
| 3,486,547 A * | 12/1969 | Powers ............... 152/454 |
| 3,736,973 A * | 6/1973 | Mezzanotte et al. ........ 152/541 |
| 6,438,932 B1 * | 8/2002 | De Vos et al. .............. 57/212 |
| 6,929,045 B1 * | 8/2005 | Ogawa ................ 152/539 |
| 2002/0170647 A1 | 11/2002 | Pereira et al. |
| 2005/0061416 A1 * | 3/2005 | Mariani et al. ............ 152/543 |

FOREIGN PATENT DOCUMENTS

| | | |
|---|---|---|
| FR | 1 234 995 | 5/1960 |
| GB | 2 185 944 A | 8/1987 |
| JP | 2004-217157 | 8/2004 |
| WO | WO 01/54927 A3 | 8/2001 |
| WO | WO 03/035378 A1 | 5/2003 |
| WO | WO 03/037659 A1 | 5/2003 |

* cited by examiner

*Primary Examiner* — Joseph Del Sole
*Assistant Examiner* — David N Brown, II
(74) *Attorney, Agent, or Firm* — Finnegan, Henderson, Farabow, Garrett & Dunner, L.L.P.

(57) ABSTRACT

In a tire for vehicle wheels, each of the two annular anchoring structures includes at least two annular reinforcing inserts, each of them being made up of at least one first elongated element and at least two reinforcing elements that are mutually spaced apart and each of which extends in a radial direction and includes at least one second elongated element. An end portion of at least one carcass ply lies between two adjacent annular reinforcing inserts. The second elongated element of at least one of the reinforcing elements is of metal material and delimits an angle included between about 20° and about 70° relative to a radial direction passing through a radially internal point thereof.

124 Claims, 6 Drawing Sheets

PNEUMATIC TYRE FOR VEHICLE WHEELS

CROSS REFERENCE TO RELATED APPLICATION

This application is a national phase application based on PCT/IB2006/052183, filed Jun. 29, 2006, the content of which is incorporated herein by reference.

BACKGROUND OF THE INVENTION

1. Field of the Invention

The present invention relates to a tyre for vehicle wheels. In particular, the present invention relates to a tyre for vehicle wheels provided with a reinforced bead structure.

Preferably, the present invention pertains to high-performance tyres such as tyres designed for high-power cars or, more generally, tyres intended for high-speed applications and/or demanding driving conditions.

2. Description of the Related Art

A tyre for vehicle wheels generally comprises a carcass structure including at least one carcass ply having respectively opposite end flaps in engagement with respective annular anchoring structures integrated into the regions usually identified with the name of "beads".

Associated with the carcass structure is a belt structure comprising one or more belt layers, disposed in radial superposed relationship relative to each other and to the carcass ply and having reinforcing textile or metallic cords with a crossed orientation and/or substantially parallel to the circumferential extension direction of the tyre. Applied to the belt structure, at a radially external position, is a tread band, which too is made of elastomeric material like the other semifinished products constituting the tyre.

To the aims of the present description, it is to be pointed out that by the term "elastomeric material" it is intended a compound comprising at least one elastomeric polymer and at least one reinforcing filler. Preferably, this compound further comprises additives such as cross-linking agents and/or plasticizers, for example. Due to the presence of the cross-linking agents, this material can be cross-linked through heating, so as to form the final product.

Respective sidewalls of elastomeric material are also applied to the side surfaces of the carcass structure, each sidewall extending from one of the side edges of the tread band until close to the respective annular anchoring structure to the beads. In tyres of the tubeless type, a coating layer of airtight material, usually referred to as "liner", covers the inner tyre surfaces.

Generally, high-performance tyres have a so-called "low section" in which the ratio between the section height, measured in the tyre cross-section along a parallel to the equatorial plane of the tyre itself, between the radially internal point of a bead and the radially external point of the tread band, and the section width defined as the maximum tyre width, is equal to or less than 0.55.

In recent production methods, instead of resorting to the manufacture and assembly of semifinished products following the traditional techniques, each tyre is preferably directly manufactured by application of components in succession onto a toroidal support.

For instance, document WO 01/54927 in the name of the same Applicant discloses a tyre in which formation of a carcass ply takes place by laying a first and a second series of strip-like sections on a toroidal support, each strip-like section comprising longitudinal filament-like elements incorporated into a layer of elastomeric material. The sections of the first series are sequentially laid to some circumferential distance from each other, to form side portions to the end flaps of which primary portions of respective reinforcing structures to the beads are applied, each of said primary portions comprising a first and a second annular insert. The sections of the second series are each interposed in the space defined between two sections of the first series, the respective end flaps overlapping the primary portions of the annular structures. A third annular insert is applied against the end flaps of the sections belonging to the second series to enclose said end portions against the second insert.

JP 2004-217157 depicts a bead structure of a tyre, in which at least two inserts are disposed, each being formed by spirally winding up an elongated element and circumferentially extending it into a bead portion. Said inserts engage a carcass ply, from axially opposite positions for example. The bead structure further has reinforcing elements defined by a composite material made of rubber and fibres. These elements consisting of a non-woven fabric and rubber components, are positioned close to a side surface of the bead inserts formed of elongated elements or close to a side surface of the carcass ply.

US 2002/0170647 shows a tyre comprising at least one reinforcing structure anchored into the bead on both sides of the tyre and circumferentially extending from the bead to the side wall. This document further shows circumferential cords, preferably in radial superposed relationship, forming a group of main cords disposed in each of the beads. Finally a group of secondary cords of the textile type is provided, which cords consist of a zero-degree single cord spirally wound up from the smaller diameter to the larger one.

The Applicant has observed that tyres made following the teachings of the above mentioned documents show a sudden decrease in the rigidity of the sidewall in the radially external region relative to said annular inserts and close to the inserts themselves.

This condition gives rise to a reduced side rigidity of the tyre that adversely affects the obtainable handling in terms of road behaviour.

In fact, the Applicant has observed that said low-rigidity region works like a hinge around which the sidewall rotates when the tyre is submitted to stresses during running. This phenomenon is further emphasised due to the fact that said low-rigidity region is close to the end of the fitting engagement defined by the rim on which the tyre is mounted.

In this respect it has been also observed that this phenomenon is particularly apparent in low-section tyres, in which the reduced section height ensures a sufficient sidewall rigidity by itself and deformation is concentrated on the hinge region as above defined.

The Applicant has observed that the reinforcing elements defined by the rubber and fibre composite material of document JP 2004-217157 and the secondary cords of the textile type of document US 2002/0170647 are not able to ensure the necessary rigidity to the tyre sidewall, above all if this tyre is of the type designed for running at high speeds and/or in the sports field.

In fact, the reinforcing elements of textile material do not offer any resistance to compressive stress and, when submitted to this types of load resulting from stresses to which the tyre is submitted in use, suffer a quick decay that can lead to separation from the blend forming the rubber coat.

The Applicant has perceived that this behaviour gives the tyre a weak fatigue strength.

In addition, the reinforcing elements of the textile type are not thermally very stable and, to the running temperatures, help in causing a decay of the tyre performance, as a macroscopic effect under hard handling conditions.

The Applicant has understood that, above all in high-speed applications and/or in the sports field, there is a need for a tyre, of the type disclosed in WO 01/54927, that is able to withstand high efforts, in particular side efforts due to hard handling conditions.

In particular, the Applicant has felt the need for a tyre provided with a reinforced bead, adapted to ensure the necessary rigidity and structural strength in the above mentioned applications.

More particularly, the Applicant has felt the need to significantly reduce the region of sudden rigidity decrease at the sidewall.

In addition, the Applicant has become aware of the necessity to manufacture a tyre that is able to substantially maintain its performance when used under hard handling conditions and also to ensure a high fatigue strength.

Therefore, the Applicant's efforts have been addressed to modifying the tyre bead regions in order to obtain lateral, longitudinal but also torsional rigidity, combined with the desired fatigue strength.

The Applicant has perceived that through application of reinforcing elements close to the beads, important advantages can be achieved in terms of lateral, longitudinal and torsional rigidity, while obtaining the necessary fatigue strength and thermal stability to the running temperatures.

SUMMARY OF THE INVENTION

In particular, the Applicant has found that through application in each bead of at least two reinforcing elements, at least one of which is a metallic element, which elements are mutually spaced apart along the axial direction, and are each formed with at least one elongated element disposed at an angle relative to a perpendicular to the radial direction, it is possible:

- to increase the rigidity of the critical side region close to the bead cores;
- to increase the tyre performance keeping it to a high degree even under hard handling conditions where a great temperature rise on running occurs;
- to increase the lateral and longitudinal rigidity of the sidewall and therefore the lateral and torsional tyre rigidity so as to improve the overall handling level.

In particular, in accordance with a first aspect of the invention, a tyre for vehicle wheels is proposed which comprises: a carcass structure including at least one carcass ply extending between two annular anchoring structures that are mutually spaced apart along an axial direction of the tyre, axially opposite end portions of said at least one carcass ply being associated with the annular anchoring structures; a tread band circumferentially extended around said carcass structure; a belt structure circumferentially positioned between said carcass structure and tread band; each of the two annular anchoring structures comprising at least two annular reinforcing inserts that are mutually and axially spaced apart and are each formed with at least one first elongated element laid into radially superposed coils; the end portion of said at least one carcass ply lying between two adjacent annular reinforcing inserts; wherein each of the two annular anchoring structures further has at least two reinforcing elements that are mutually spaced along the axial direction and each of which extends in a radial direction and comprises at least one second elongated element, said second elongated element of at least one reinforcing element being of the metallic type; wherein each second elongated element delimits an angle $\alpha$ included between about 20° and about 70° relative to a radial direction passing through a radially internal point of said second elongated element.

In a preferred embodiment of said tyre in accordance with the invention, said angle $\alpha$ is in the range of 45° to 70°.

In addition, advantageously, said second elongated element is a cord.

Preferably, each reinforcing element comprises a plurality of cords disposed in side by side relationship.

According to a preferred embodiment, the cords of at least one of said reinforcing elements delimit angles "$\alpha$" that are opposite to the angles "$\alpha$" delimited by the cords of the other reinforcing elements.

According to a further preferred embodiment, the cords of at least one of said reinforcing elements delimit angles "$\alpha$" that are equal to, and opposite to the angles "$\alpha$" delimited by the cords of the other reinforcing elements.

The possibility of orienting the cords during the manufacturing step enables the torsional strength of the tyre to be controlled during acceleration and braking, depending on the specific requirements of each application. In fact, the arrangement of said cords according to a not radial direction further gives the sidewall a longitudinal strength, i.e. a strength directed to all points as the tangent to a circumference concentric to the rolling axis of the tyre. This localised longitudinal strength results in the overall torsional tyre strength. The cord orientation enables more torsional strength to be given in a predetermined rotation direction, on driving or braking, of the tyre.

In accordance with a preferred embodiment of the invention, an average value of a radial extension of the reinforcing elements is included between about 25% and about 90% of a tyre section height.

Preferably, said average value is included between about 30% and about 55% of the tyre section height.

In addition, the ratio of the section height of the radially less extended reinforcing element to the section height of the radially more extended reinforcing element is included between about 0.3 and about 1.

Preferably, said ratio is included between about 0.6 and about 0.9.

These features enable the sidewall rigidity to be controlled through modification of the rigidity gradient and the bending profile of the sidewall itself.

In accordance with a preferred embodiment, in each annular anchoring structure the end portion of at least one carcass ply is axially interposed between said at least two reinforcing elements.

Preferably, said at least two annular reinforcing inserts are interposed between said at least two reinforcing elements.

Preferably, in addition, each of the two annular anchoring structures has at least three annular reinforcing inserts, at least two of said annular reinforcing inserts being interposed between said at least two reinforcing elements.

Preferably, two reinforcing elements lie at mutually opposite axial positions that are external to the annular reinforcing inserts and to the end portions of said at least one carcass ply.

Preferably, at least one of said reinforcing elements lies axially interposed between the end portions of said at least one carcass ply.

Preferably, at least one of said reinforcing elements lies axially interposed between the annular reinforcing inserts.

In accordance with a further preferred embodiment, said at least two reinforcing elements are joined by a connecting portion so as to form a single reinforcing element, said connecting portion extending in a radially internal region relative to the annular reinforcing inserts and to the end portions of at least one carcass ply, so as to define an encircling loop.

In addition, preferably, at least one of the end portions of a carcass ply is turned up around at least one annular reinforcing insert.

Preferably, at least two of said reinforcing elements are disposed axially contiguous to each other.

In fact, the bending and longitudinal rigidity can be advantageously controlled by the geometry of the bead section too, i.e. by the number and mutual position of the carcass plies, the annular reinforcing inserts and the reinforcing elements.

In addition, preferably, said cord has a diameter in the range of about 0.2 mm to about 1 mm.

Furthermore, said cord is preferably alternatively made of steel, aluminium, aluminium alloy, or steel and aluminium.

Said cord preferably has a coating selected from group comprising brass, zinc, zinc/manganese alloys, zinc/cobalt alloys, zinc/cobalt/manganese alloys.

In addition, preferably the reinforcing elements have a density included between 40 cords/dm and 160 cords/dm.

Still more preferably, said reinforcing elements have a density included between 70 cords/dm and 110 cords/dm.

Selection of the cord material and cord section enables further parameters to be available for control of the sidewall rigidity.

In addition, according to a different embodiment of the invention, each cord comprises at least one pre-deformed wire.

Preferably, said pre-deformed wire has an undulated form.

Preferably this undulated form is of the sinusoidal type.

Alternatively, said undulated form is of the helical type.

Preferably, said pre-deformed wire has a diameter included between about 0.05 mm and about 0.25 mm.

In accordance with one embodiment, said pre-deformed wire is alternatively made of steel, aluminium, aluminium alloy, or steel and aluminium.

Preferably, said pre-deformed wire has a coating selected from the group comprising brass, zinc, zinc/manganese alloys, zinc/cobalt alloys, zinc/cobalt/manganese alloys.

Advantageously, adopting cords with pre-deformed wires gives rise to an increase in the fatigue and corrosion strength. In fact, the blend in which the cords are embedded sticks on the cords having pre-deformed wires in an optimal manner without regions devoid of material and exposed to the air being formed, even after aging. In addition, the compressive strength of the reinforcing elements provided with said cords is greater than that offered by reinforcing elements having linear cords and allows separation of said cords from the blend being avoided during use, thereby increasing the tyre fatigue strength.

Furthermore, adopting cords with pre-deformed wires gives the cords themselves such elasticity characteristics that installation of the tyre on the rim is facilitated and clinging of the tyre itself to the rim is ensured even in the event of a reduced inflating pressure.

Finally, preferably, a ratio of a section height to a section width of said tyre is included between about 0.25 and about 0.55.

Further features and advantages of the invention will become more apparent from the detailed description of some preferred but not exclusive embodiments of a tyre for vehicle wheels in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

In the following of the present specification reference will be preferably made to tyres having a so-called "low-section", in which the ratio of the section height "$H_s$", measured in the cross section of the tyre along a parallel to an equatorial plane thereof, between the radially internal point of a bead and the radially external point of the tread band (FIG. 2), to the section width "$L_s$" defined as the maximum tyre width, is equal to or smaller than 0.55 and preferably included between about 0.25 and about 0.55.

Figure 1:
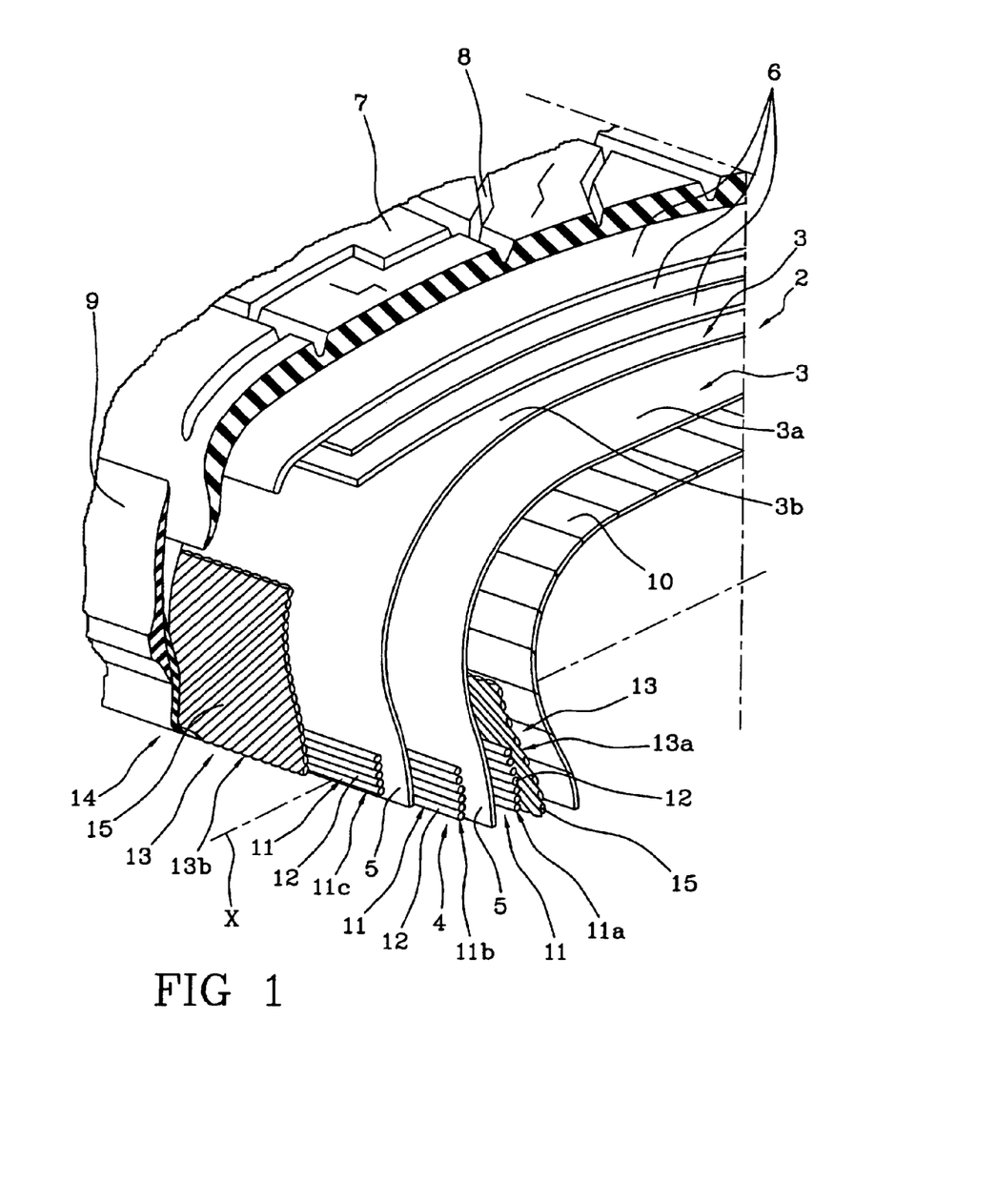
FIG. 1 is a fragmentary perspective view in split of a tyre provided with a reinforcing bead structure in accordance with the invention.

FIG. 1 shows a first preferred embodiment of tyre 1 in accordance with the invention comprising a carcass structure 2.

The carcass structure 2 has at least one carcass ply 3 having a substantially toroidal conformation and engaged, through its opposite circumferential edges, with a pair of annular anchoring structures 4, each of which is located in the region usually identified with the name of "bead". In particular, two annular anchoring structures 4 are mutually spaced apart along an axial direction "X" of tyre 1, parallel to the geometric rolling axis of the latter, and axially opposite end portions 5 of the carcass ply 3 are associated with said annular anchoring structures 4.

Applied to the carcass structure 2, at a circumferentially external position, is a belt structure 6 comprising one or more belt strips.

A tread band 7 is circumferentially superposed on the belt structure 6 and longitudinal and transverse grooves 8 are formed in said tread band so as to define a desired "tread pattern".

The tyre also comprises a pair of so-called sidewalls 9 laterally applied to the carcass structure 2 on opposite sides thereof. The carcass structure 2 on its inner walls can possibly be coated with a sealing layer 10, or a so-called "liner", essentially consisting of a layer of airtight elastomeric material adapted to ensure the hermetic seal of the tyre when inflated.

In accordance with the embodiment shown in FIG. 1, tyre 1 has a first 3a and a second 3b carcass plies that are mutually superposed and each of which terminates with respective end portions 5 associated with the annular anchoring structures 4. The first carcass ply 3a is positioned in contact with liner 10 while the second carcass ply 3b overlaps the first one.

Alternatively, according to another embodiment not shown, tyre 1 has a single carcass ply 3 formed with a first and a second series of strip-like sections circumferentially distributed in succession. In particular, each of the strip-like sections has a substantially rectangular planar shape and extends between the two annular anchoring structures 4. In addition, successive strip-like sections are disposed in side by side relationship along their major sides.

Each of the two annular anchoring structures 4 comprises at least two annular reinforcing inserts 11 that are mutually and axially spaced apart.

Each of said annular reinforcing inserts 11 is made up of at least one first elongated element 12 arranged into radially superposed coils and preferably defined by a rubberised metallic cord.

Preferably, the first elongated element 12 is wound up to form several substantially concentric coils that can be defined by a continuous spiral or by concentric rings made up of respective first elongated elements 12.

Each of the annular reinforcing inserts 11 is substantially in the form of an annulus concentric to the geometric rotation axis of tyre 1.

In addition, the end portion 5 of at least one of the carcass plies 3 lies between two adjacent annular reinforcing inserts 11.

Advantageously, each of the two annular anchoring structures 4 further has at least two reinforcing elements 13 mutually spaced apart along said axial direction "X".

Each of the reinforcing elements 13 extends in a radial direction from a radially internal edge 14 of tyre 1 to the tread band 7 and comprises at least one second elongated element 15.

In addition, like the annular reinforcing insert 11, the reinforcing element 13 too is substantially shaped in the form of an annulus concentric to the geometric rotation axis of tyre 1.

Preferably, each of the reinforcing elements 13 comprises a plurality of second elongated elements 15 disposed in mutual side by side relationship and substantially parallel.

Alternatively, each of the reinforcing elements 13 comprises only one second elongated element 15 disposed on the tyre sidewall so as to have parallel segments disposed side by side and connected by loops belonging to the same elongated element 15 and substantially oriented along the radial extension of the sidewall itself. Moreover, advantageously, the second elongated element 15 of at least one of the reinforcing elements 13 is of the metallic type.

In the preferred embodiments herein shown, the second elongated element 15 is a cord and each of the reinforcing elements 13 comprises a plurality of cords 15 disposed side by side.

By the term cord in the present specification it is intended a bundle of at least two wires twisted into each other. This cord 15 is made of steel, aluminium, aluminium alloy or steel and aluminium, for example, and preferably has a diameter included between about 0.2 mm and about 1 mm. In addition, according to an alternative embodiment, the cord 15 is coated with, for instance, brass, zinc, zinc/manganese alloys, zinc/cobalt alloys, zinc/cobalt/manganese alloys.

The density of the cords defining the reinforcing elements 13 is preferably included between 40 cords/dm and 160 cords/dm and more preferably between 70 cords/dm and 110 cords/dm.

In addition, adopting metallic cords 15 of the type described in the patent application WO 2005/014309 in the name of the same Applicant also falls within the scope of the present invention.

Each of these cords 15 comprises at least one pre-deformed wire where the term "pre-deformed wire" in the present description means a wire that is submitted to permanent set before making the cord, i.e. before winding of the wire with at least another wire so that its longitudinal extension takes an undulated form, a sinusoidal, zigzag or helical form, for example. By undulated form it is therefore intended any form that is not straight.

A pre-deformed wire of the above described type when submitted to a tensile force has a tendency to take the stretched and rectilinear shape and then resiliently come back to the undulated form in a rest condition, i.e. when said tensile force stops.

Said pre-deformed wire preferably has a diameter included between about 0.05 mm and 0.25 mm. In addition, each pre-deformed wire is preferably alternatively made of: steel, aluminium or aluminium alloy and preferably has a coating selected from the group comprising brass, zinc, zinc/manganese alloys, zinc/cobalt alloys, zinc/cobalt/manganese alloys.

Referring to a section obtained in a radial plane of tyre 1, as shown in FIGS. 3 to 9, in each annular anchoring structure 4 the respective end portion 5 of at least one carcass ply/half-ply 3 is preferably axially interposed between said at least two reinforcing elements 13. In addition, preferably, in the embodiments comprising a plurality of carcass plies 3, or a single ply 3 formed of half-plies, the end portion 5 of each carcass ply/half-ply 3 is axially interposed between said at least two reinforcing elements 13.

It is to be pointed out that in the present specification and in the appended claims, by carcass half-ply it is intended the assembly of said first or said second series of strip-like sections circumferentially distributed on an inner toroidal surface of the tyre, so that a space is present between one of them and the subsequent one, which space is substantially at least equal to the cross size of the strip-like section itself.

In addition, said at least two annular reinforcing inserts 11 too are preferably interposed between said at least two reinforcing elements 13.

In an alternative embodiment, in which each of the two annular anchoring structures 4 has at least three annular reinforcing inserts 11a, 11b, 11c, advantageously at least two of said annular reinforcing inserts are interposed between said at least two reinforcing elements 13.

In the preferred embodiments shown in FIGS. 3, 4, 6 and 7, the two reinforcing elements 13 lie in mutually opposite axial positions that are external both to the annular reinforcing inserts 11 and to the end portions 5 of the carcass ply 3 or carcass plies/half-plies 3.

In addition, in an alternative embodiment, at least one of the reinforcing elements 13 lies axially interposed between the end portions 5 of said at least one carcass ply 3.

In a further alternative embodiment, at least one of the reinforcing elements 13 lies axially interposed between the annular reinforcing inserts 11.

Preferably, in addition, at least one of the end portions 5 of a carcass ply 3 is turned up around at least one annular reinforcing insert 11.

In a further preferred alternative embodiment, said at least two reinforcing elements 13 are joined by a connecting portion 16, so as to form a single reinforcing element. Said connecting portion 16 extends in a radially internal region relative to the annular reinforcing inserts 11 and to the end portions 5 of at least one carcass ply 3, so as to define an encircling loop.

Figure 2:
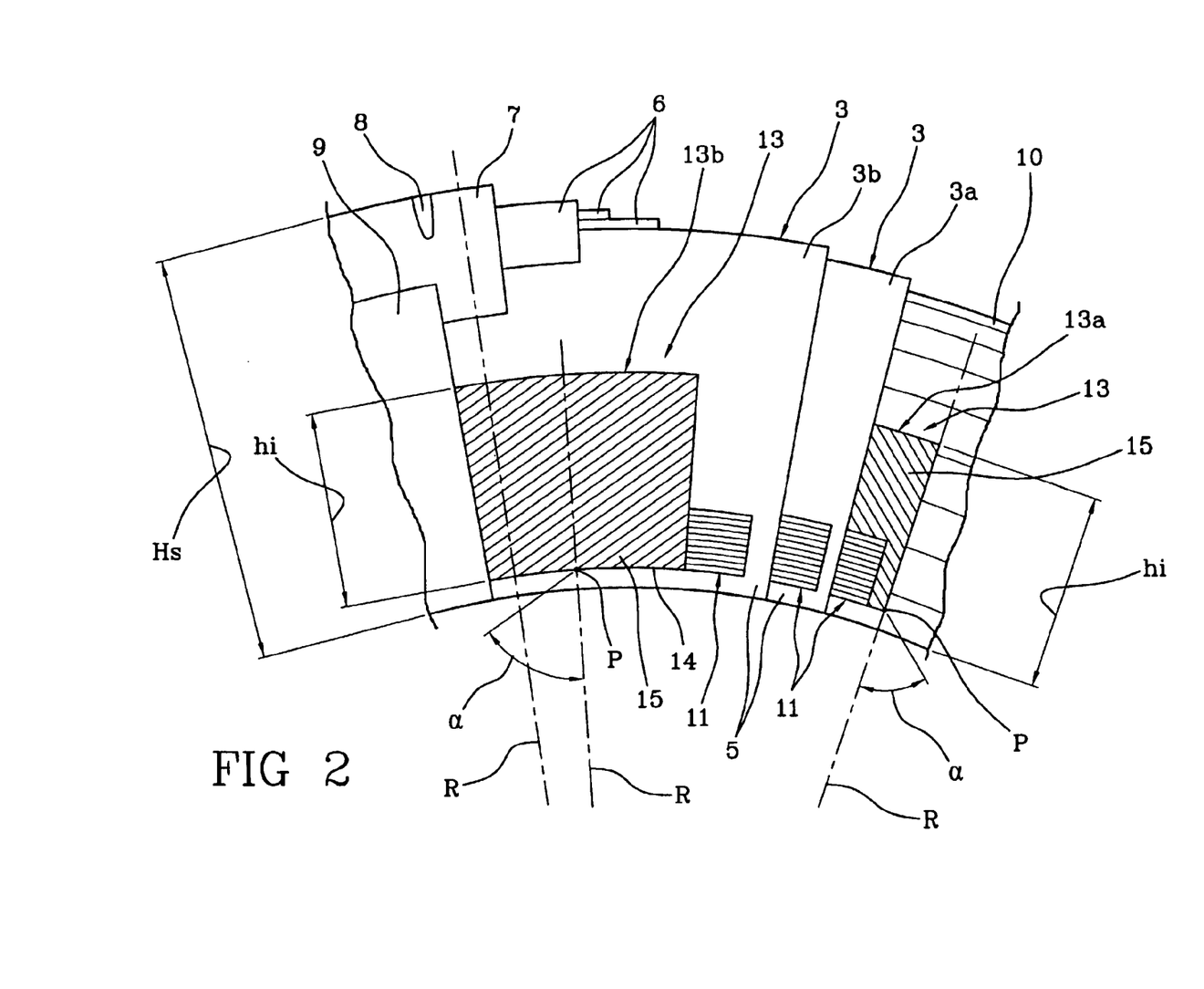
FIG. 2 is a side view of the tyre seen in FIG. 1.

Furthermore, with reference to FIG. 2, each second elongated element 15 advantageously delimits an angle "α" relative to a radial direction/plane "R" passing through a radially internal point "p" of the second elongated element 15 itself, which angle "α" is different from 90° and is preferably included between about 20° and about 70° and more preferably included between about 45° and about 70°.

In the embodiment not shown in which a single second elongated element 15 is disposed on the sidewall of tyre 1 so as to present parallel segments disposed side by side, the angle "α" refers to each of said segments.

Since the reinforcing elements 13 do not lie in a single plane, this angle "α" is better identified by the projection of said second elongated element 15, or of the individual segment, in a plane parallel to the equatorial plane of tyre 1, i.e. in a plane perpendicular to the geometric rotation axis of the tyre 1 itself.

In an alternative embodiment, the cords 15 of at least one of the reinforcing elements 13 delimit angles "α" that are opposite to the angles "α" delimited by the cords 15 of the other reinforcing elements 13.

In other words, each of the cords 15 of one of the reinforcing elements 13 is inclined to the radial direction plane "R" referred thereto, in a direction opposite to the homologous cord, i.e. having a radially internal point "p" substantially passing through the same radial plane "R" of a different reinforcing element 13.

Preferably, in addition, the cords 15 of at least one of the reinforcing elements 13 delimit angles "α" that are equal to, and opposite to the angles "α" delimited by the cords 15 of the other reinforcing elements 13.

In other words, each of the cords 15 of one of the reinforcing elements 13 is inclined to the radial direction plane "R" referred thereto, by the same angle but in an opposite direction relative to the homologous cord of a different reinforcing element 13.

Alternatively, the cords 15 of all the reinforcing elements 13 are inclined in the same direction. Homologous cords 15 of different reinforcing elements 13 can also be parallel.

In any case, the inclination of the cords of a single reinforcing element 13 and the relative inclination with respect to the other reinforcing elements 13 can be of any type and is selected when the tyre is being designed, based on the torsional rigidity to be given to the tyre itself on running and on braking.

In addition, the average value "$h_m$" of the radial extension "$h_i$" of the reinforcing elements 13 is included between about 25% and about 90% of the section height "$H_s$" of tyre 1.

Figure 3:
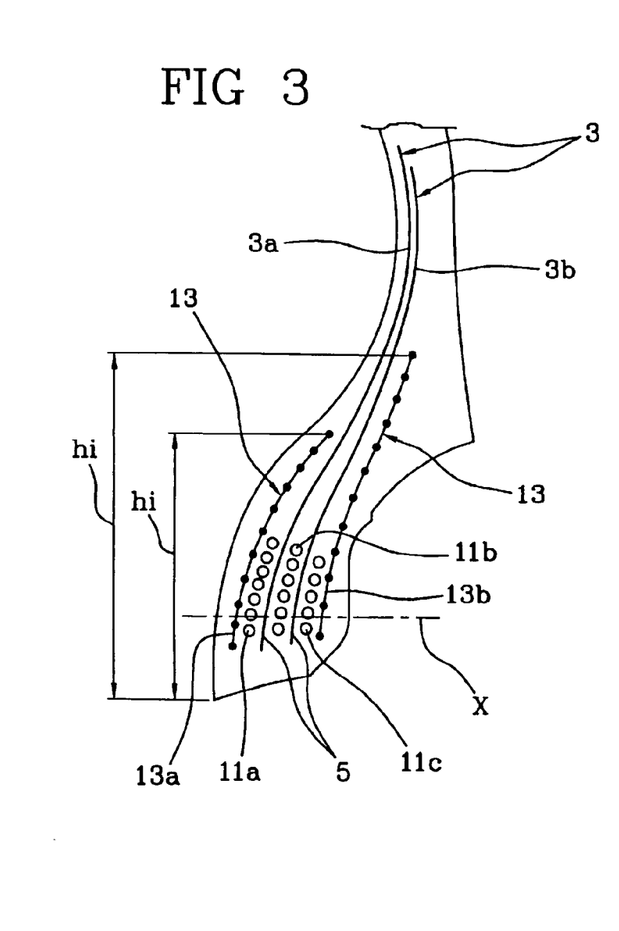
FIG. 3 is an enlarged radially sectioned view of a bead of the tyre in FIG. 1.

By radial extension "$h_i$" of each of the reinforcing elements 13 it is intended in the present description the height of the same reinforcing element 13 measured along a radial direction of tyre 1 in a plane parallel to the equatorial plane thereof, starting from the inner circumferential edge 14 of the bead until the radially external edge of said reinforcing element 13 (FIGS. 2 and 3).

The average value "$h_m$" is given by the sum of the radial extension "$h_i$" of all reinforcing elements 13 divided by the number of these reinforcing elements 13.

Preferably, the average value "h." as above defined is included between about 30% and about 55% of the section height "$H_s$" of tyre 1.

In addition, the ratio "$h_{min}/h_{max}$" between the section height "$h_{min}$" of the radially less extended reinforcing element and the section height "$h_{max}$" of the radially more extended reinforcing element 13 is included between about 0.3 and about 1 and, preferably, between about 0.6 and about 0.9.

The radially more extended reinforcing element 13 and the radially less extended reinforcing element 13 can be located at an axially internal, median or external position relative to the other reinforcing elements 13.

In addition, preferably, the reinforcing elements 13 have a greater radial extension than the radial extension of the annular reinforcing inserts 11.

In particular, the tyre 1 in accordance with the embodiment shown in FIGS. 1, 2 and 3, has a first annular reinforcing insert 11a disposed at an axially internal position relative to the end portion 5 of the first carcass ply 3a, a second annular reinforcing insert 11b interposed between the end portion 5 of the first carcass ply 3a and the end portion 5 of the second carcass ply 3b and a third annular reinforcing insert 11c disposed at an axially external position relative to said end portion 5 of the second carcass ply 3b.

Therefore, each of the end portions 5 of the two carcass plies 3a, 3b lies between two adjacent annular reinforcing inserts 11a, 11b; 11b, 11c.

In addition, a first reinforcing element 13a is located at an axially internal position relative to the first annular reinforcing insert 11a, i.e. interposed between said first annular reinforcing insert 11a and liner 10.

A second reinforcing element 13b is located at an axially external position relative to the third annular reinforcing insert 11c, i.e. it is interposed between one sidewall 9 and said third annular insert 11c.

Therefore, each of the end portions 5 of the two carcass plies 3a, 3b also lies between the two reinforcing elements 13a, 13b.

The second reinforcing element 13b has a greater radial extension "$h_i$" than the radial extension "$h_i$" of the first reinforcing element 13a.

In addition, as shown in FIGS. 1 and 2, the angles "α" of the cords 15 of the first reinforcing element 13a are opposite to the angles "α" of the cords 15 of the second reinforcing element 13b. Finally, both the reinforcing elements 13a, 13b have a greater radial extension than the radial extension of the annular reinforcing inserts 11a, 11b, 11c.

Figure 4:
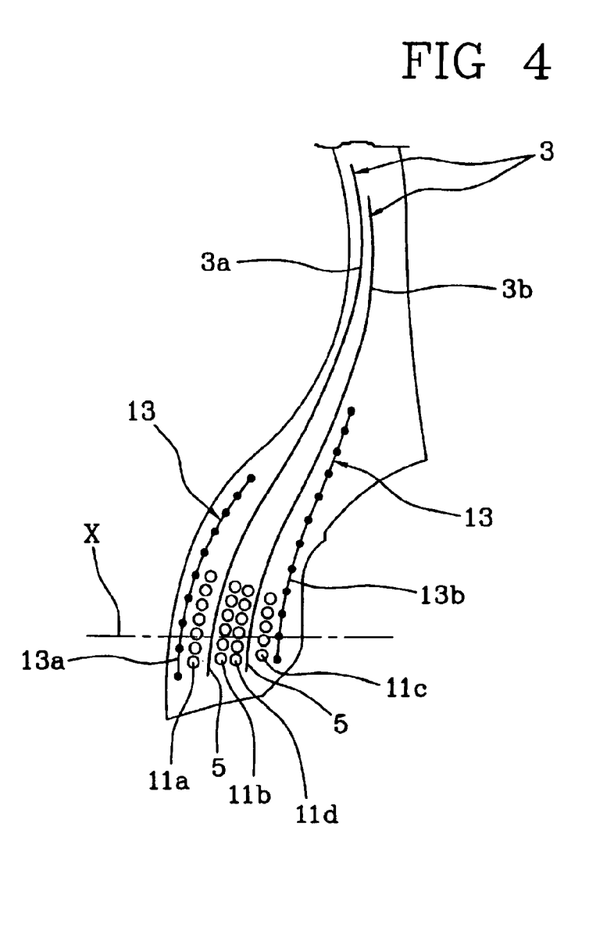
FIG. 4 shows a first alternative embodiment of the bead seen in FIG. 2.

In the first alternative embodiment shown in FIG. 4, unlike the embodiment seen in FIGS. 1, 2 and 3, a further fourth annular reinforcing insert 11d is present and it is interposed between the second annular reinforcing insert 11b and the end portion 5 of the second carcass ply 3b. Therefore two annular reinforcing inserts 11b, 11d contiguous to each other are located between the first and second carcass plies 3a, 3b.

Figure 5:
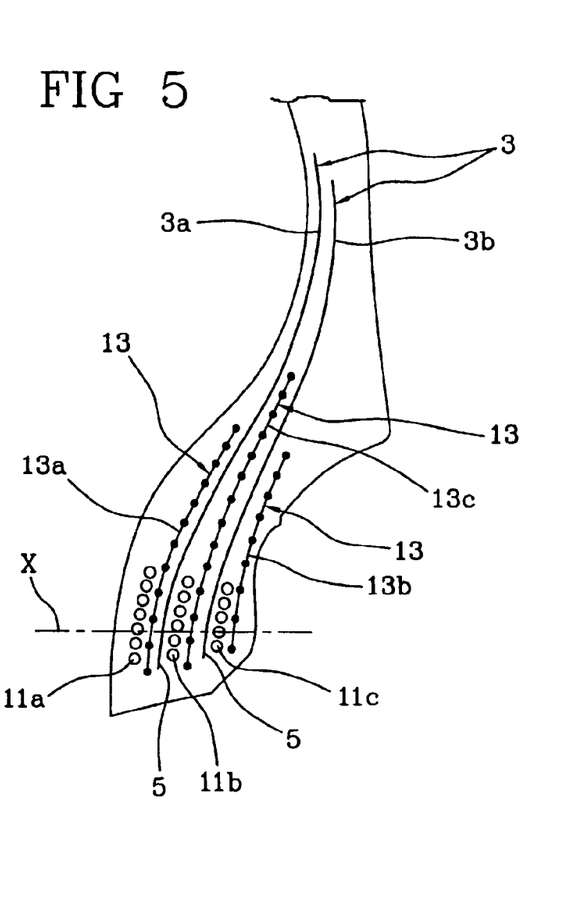
FIG. 5 shows a second alternative embodiment of the bead seen in FIG. 2.

In a second alternative embodiment shown in FIG. 5, unlike the embodiment in FIGS. 1, 2 and 3, a further third reinforcing element 13c is present and it is interposed between the second annular reinforcing insert 11b and the end portion 5 of the second carcass ply 3b. In addition, the first annular reinforcing insert 11a is located at an axially internal position relative to the first reinforcing element 13a that therefore stays in an interposed position between said first annular reinforcing insert 11a and the end portion 5 of the first carcass ply 3a.

The third reinforcing element 13c has a greater radial extension "$h_i$" than the radial extension "$h_i$" of the first and second reinforcing elements 13a, 13b.

Figure 6:
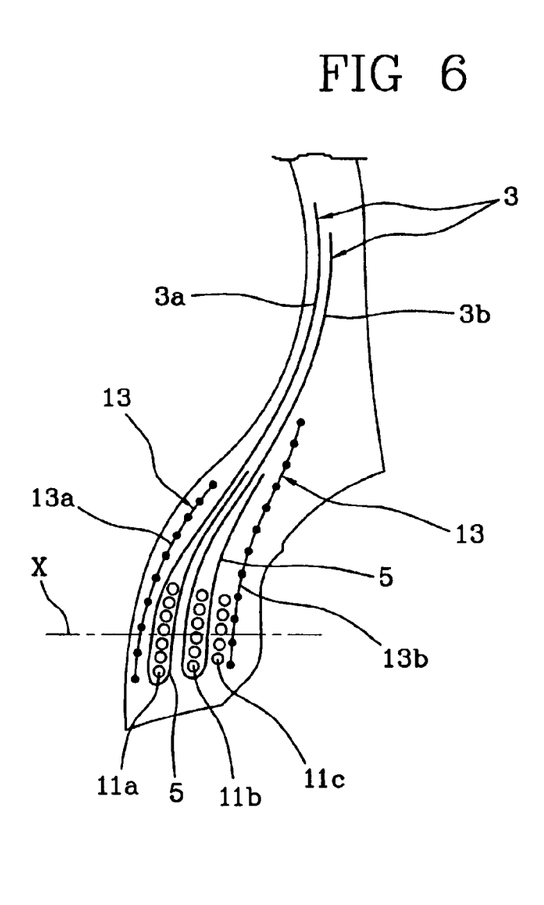
FIG. 6 shows a third alternative embodiment of the bead seen in FIG. 2.

In a third alternative embodiment shown in FIG. 6, unlike the embodiment in FIGS. 1, 2 and 3, the end portions 5 of both carcass plies 3a, 3b are turned up each around a respective annular reinforcing insert 11.

In particular, the first carcass ply 3a first passes between the first reinforcing element 13a and the first annular reinforcing insert 11a, then is turned over under said first annular reinforcing insert 11a, is interposed between the first annular reinforcing insert 11a and the second annular reinforcing insert 11b and terminates with the end portion 5 extending in a radially external direction beyond the first and second annular reinforcing inserts 11a, 11b.

The second carcass ply 3b passes between the first annular reinforcing insert 11a and the second annular reinforcing insert 11b, is turned over under said second annular reinforcing insert 11b, is interposed between the second annular reinforcing insert 11b and the third annular reinforcing insert 11c and terminates with the end portion 5 extending in a radially external direction beyond the second and third annular reinforcing inserts 11b, 11c.

Figure 7:
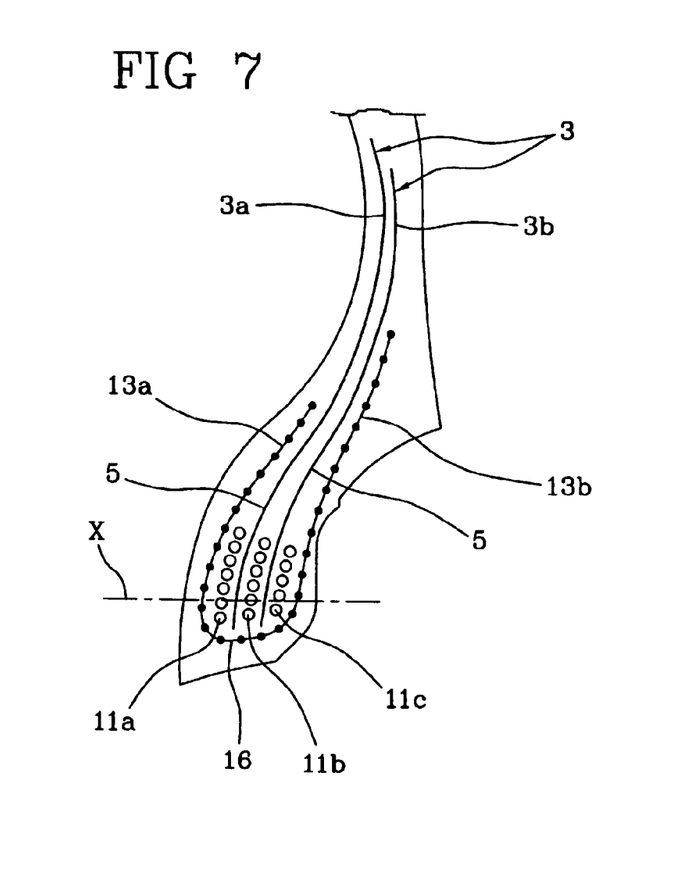
FIG. 7 shows a fourth alternative embodiment of the bead seen in FIG. 2.

In a fourth alternative embodiment shown in FIG. 7, unlike the embodiment in FIGS. 1, 2 and 3, the first 13a and second 13b reinforcing elements are joined by the connecting portion 16 and therefore form a single element wrapping all the three annular reinforcing inserts 11a, 11b, 11c and both the end portions 5 of the carcass plies 3a and 3b.

Figure 8:
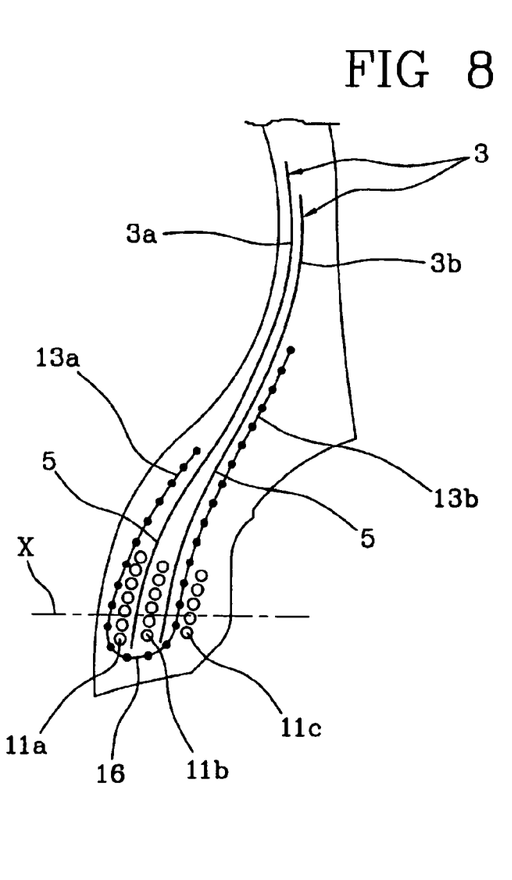
FIG. 8 shows a fifth alternative embodiment of the bead seen in FIG. 2.

As compared with the fourth variant shown in FIG. 7, in a fifth embodiment seen in FIG. 8 the third annular reinforcing insert 11c is placed at an axially external position to the loop defined by the first reinforcing element 13a, the second reinforcing element 13b and the connecting portion 16, and lies in side by side relationship with said second reinforcing element 13b.

Figure 9:
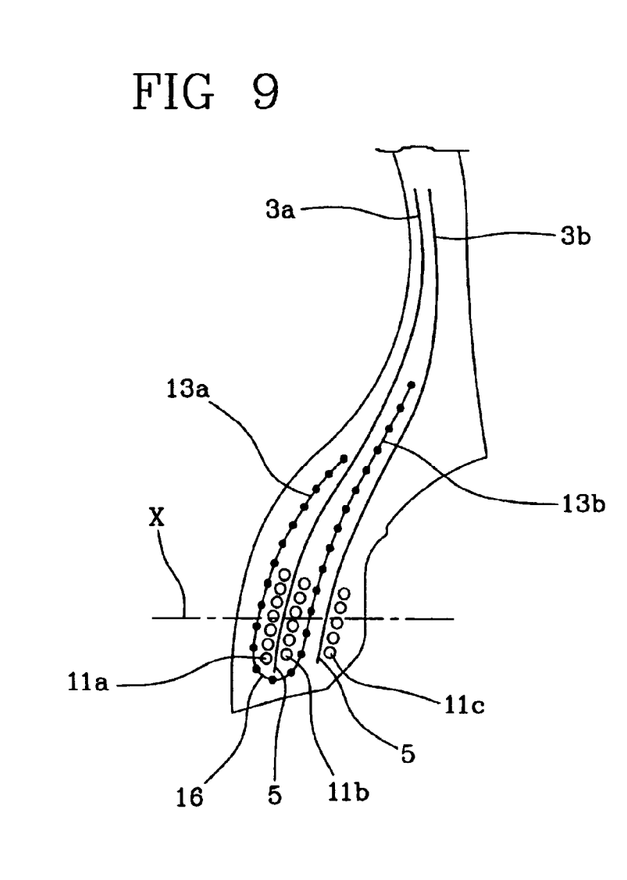
FIG. 9 shows a sixth alternative embodiment of the bead seen in FIG. 2.

In a sixth alternative embodiment shown in FIG. 9, as compared with the fifth variant in FIG. 8, the end portion 5 of the second ply 3b too is placed at an axially external position to said loop and lies in side by side relationship with the second reinforcing element 13b.

Since in the embodiments in FIGS. 7, 8 and 9 the first and second reinforcing elements, 13a and 13b respectively, are actually formed from a single element, necessarily the cords of one of these reinforcing elements delimit angles "α" that are equal to, and opposite to the angles "α" delimited by the cords of the other reinforcing element.

Figure 10:
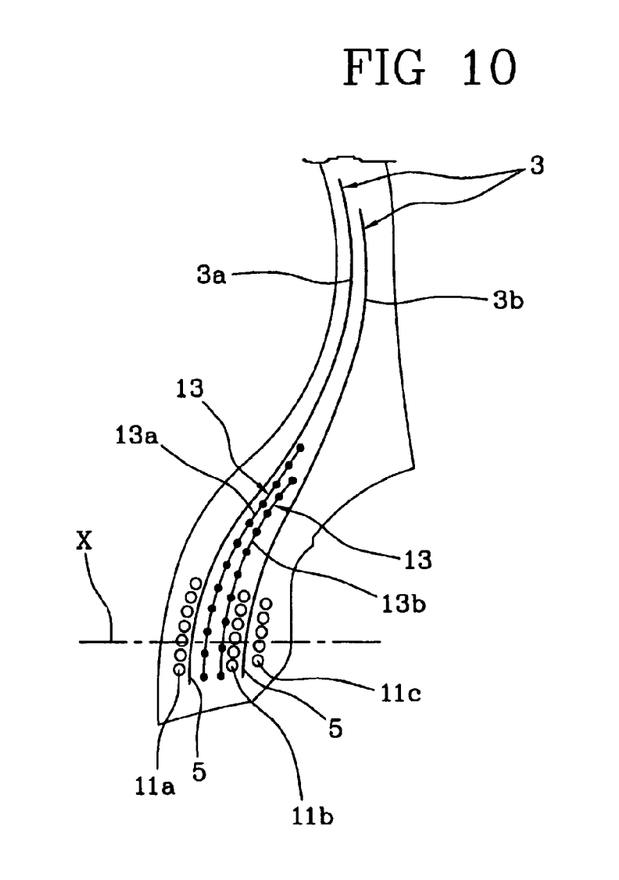
FIG. 10 shows a seventh alternative embodiment of the bead seen in FIG. 2.

In a seventh embodiment shown in FIG. 10, tyre 1 has a first annular reinforcing insert 11a disposed at an axially internal position relative to the end portion 5 of the first carcass ply 3a, a second annular reinforcing insert 11b interposed between the end portion 5 of the first carcass ply 3a and the end portion 5 of the second carcass ply 3b and a third annular reinforcing insert 11c disposed at an axially external position to said end portion 5 of the second carcass ply 3b.

In addition, a first reinforcing element 13a is located at an axially external position relative to the first carcass ply 3a and at a position axially internal to the second annular reinforcing insert 11b.

A second reinforcing element 13b is located at an axially external position relative to said first reinforcing element 13a and at a position axially internal to said second annular reinforcing insert 11b, i.e. said first 13a and second 13b reinforcing elements are axially contiguous to each other.

The first reinforcing element 13a has a greater radial extension "$h_i$" than the radial extension "$h_j$" of the second reinforcing element 13b.

It is finally to be pointed out that the examples illustrated hereabove can also apply to tyres having a single carcass ply, in which case all references made to the carcass plies are to be intended as referred to corresponding half-plies.

The invention claimed is:

1. The tyre for vehicle wheels comprising:
a carcass structure comprising at least one carcass ply extending between two annular anchoring structures that are mutually spaced apart along an axial direction of the tyre, and having axially opposite end portions of said at least one carcass ply associated with the annular anchoring structures;
a tread band circumferentially extended around said carcass structure;
a belt structure circumferentially positioned between said carcass structure and tread band; and
each of the two annular anchoring structures comprising at least two annular reinforcing inserts that are mutually and axially spaced apart and are each formed with at least one first elongated element laid into radially superposed coils, the end portion of said at least one carcass ply lying between two adjacent annular reinforcing inserts;
wherein each of the two annular anchoring structures further comprises at least two reinforcing elements that are mutually spaced along the axial direction and each extending in a radial direction and comprising at least one second elongated element, said second elongated element of at least one reinforcing element being of the metallic type;
wherein each second elongated element delimits an angle between about 20° and about 70°, relative to a radial direction passing through a radially internal point of said second elongated element; and
wherein a ratio of the section height of the radially less extended reinforcing element to the section height of the radially more extended reinforcing element is between about 0.3 and 1.

2. The tyre as claimed in claim 1, wherein said angle is included between 45° and 70°.

3. The tyre as claimed in claim 1, wherein said second elongated element is a cord.

4. The tyre as claimed in claim 3, wherein each reinforcing element comprises a plurality of cords disposed in side by side relationship.

5. The tyre as claimed in claim 4, wherein the cords of at least one of said reinforcing elements delimit angles that are opposite to the angles delimited by the cords of the other reinforcing elements.

6. The tyre as claimed in claim 4, wherein the cords of at least one of said reinforcing elements delimit angles that are equal to and opposite to the angles delimited by the cords of the other reinforcing elements.

7. The tyre as claimed in claim 1, wherein an average value of a radial extension of the reinforcing elements is between about 25% and about 90% of a section height of the tyre.

8. The tyre as claimed in claim 7, wherein said average value is between about 30% and about 55% of the section height of the tyre.

9. The tyre as claimed in claim 1, wherein said ratio is between about 0.6 and about 0.9.

10. The tyre as claimed in claim 1, wherein in each annular anchoring structure, the end portion of at least one carcass ply is axially interposed between said at least two reinforcing elements.

11. The tyre as claimed in claim 1, wherein said at least two annular reinforcing inserts are interposed between said at least two reinforcing elements.

12. The tyre as claimed in claim 1, wherein each of the two annular anchoring structures has at least three annular reinforcing inserts, at least two of said annular reinforcing inserts being interposed between said at least two reinforcing elements.

13. The tyre as claimed in claim 1, wherein two reinforcing elements lie at mutually opposite axial positions that are external to the annular reinforcing inserts and to the end portions of said at least one carcass ply.

14. The tyre as claimed in claim 1, wherein at least one of said reinforcing elements lies axially interposed between the end portions of said at least one carcass ply.

15. The tyre as claimed in claim 1, wherein at least one of said reinforcing elements lies axially interposed between the annular reinforcing inserts.

16. The tyre as claimed in claim 1, wherein at least one of the end portions of a carcass ply is turned up across at least one annular reinforcing insert.

17. The tyre as claimed in claim 1, wherein at least two of said reinforcing elements are disposed axially contiguous to each other.

18. The tyre as claimed in claim 4, wherein said cord has a diameter between about 0.2 mm and about 1 mm.

19. The tyre as claimed in claim 4, wherein said cord is alternatively made of steel, aluminium, aluminium alloy, or steel and aluminium.

20. The tyre as claimed in claim 4, wherein said cord has a coating selected from brass, zinc, zinc/manganese alloys, zinc/cobalt alloys, zinc/cobalt/manganese alloys.

21. The tyre as claimed in claim 4, wherein the reinforcing elements have a density between 40 cords/dm and 160 cords/dm.

22. The tyre as claimed in claim 21, wherein the reinforcing elements have a density between 70 cords/dm and 110 cords/dm.

23. The tyre as claimed in claim 4, wherein each cord comprises at least one pre-deformed wire.

24. The tyre as claimed in claim 23, wherein said pre-deformed wire has an undulated shape.

25. The tyre as claimed in claim 24, wherein said undulated shape is sinusoidal.

26. The tyre as claimed in claim 24, wherein said undulated shape is helical.

27. The tyre as claimed in claim 23, wherein said pre-deformed wire has a diameter between about 0.05 mm and about 0.25 mm.

28. The tyre as claimed in claim 23, wherein said pre-deformed wire is alternatively made of steel, aluminium, aluminium alloy, or steel and aluminium.

29. The tyre as claimed in claim 23, wherein said pre-deformed wire has a coating selected from brass, zinc, zinc/manganese alloys, zinc/cobalt alloys, and zinc/cobalt/manganese alloys.

30. The tyre as claimed in claim 1, wherein a ratio between a section height and a section width of said tyre is between about 0.25 and about 0.55.

31. The tyre for vehicle wheels comprising:
a carcass structure comprising at least one carcass ply extending between two annular anchoring structures that are mutually spaced apart along an axial direction of the tyre, and having axially opposite end portions of said at least one carcass ply associated with the annular anchoring structures;
a tread band circumferentially extended around said carcass structure;
a belt structure circumferentially positioned between said carcass structure and tread band; and
each of the two annular anchoring structures comprising at least two annular reinforcing inserts that are mutually and axially spaced apart and are each formed with at least one first elongated element laid into radially superposed coils, the end portion of said at least one carcass ply lying between two adjacent annular reinforcing inserts;
wherein each of the two annular anchoring structures further comprises at least two reinforcing elements that are mutually spaced along the axial direction and each extending in a radial direction and comprising at least one second elongated element, said second elongated element of at least one reinforcing element being of the metallic type;
wherein each second elongated element delimits an angle between about 20° and about 70°, relative to a radial direction passing through a radially internal point of said second elongated element;
wherein said at least two reinforcing elements are joined by a connecting portion so as to form a single reinforcing element, said connecting portion extending in a radially internal region relative to the annular reinforcing inserts and to the end portions of at least one carcass ply so as to define an encircling loop.

32. The tyre as claimed in claim 31, wherein said angle is included between 45° and 70°.

33. The tyre as claimed in claim 31, wherein said second elongated element is a cord.

34. The tyre as claimed in claim 33, wherein each reinforcing element comprises a plurality of cords disposed in side by side relationship.

35. The tyre as claimed in claim 34, wherein the cords of at least one of said reinforcing elements delimit angles that are opposite to the angles delimited by the cords of the other reinforcing elements.

36. The tyre as claimed in claim 34, wherein the cords of at least one of said reinforcing elements delimit angles that are equal to and opposite to the angles delimited by the cords of the other reinforcing elements.

37. The tyre as claimed in claim 31, wherein an average value of a radial extension of the reinforcing elements is between about 25% and about 90% of a section height of the tyre.

38. The tyre as claimed in claim 37, wherein said average value is between about 30% and about 55% of the section height of the tyre.

39. The tyre as claimed in claim 31, wherein a ratio of the section height of the radially less extended reinforcing element to the section height of the radially more extended reinforcing element is between about 0.3 and 1.

40. The tyre as claimed in claim 39, wherein said ratio is between about 0.6 and about 0.9.

41. The tyre as claimed in claim 31, wherein in each annular anchoring structure, the end portion of at least one carcass ply is axially interposed between said at least two reinforcing elements.

42. The tyre as claimed in claim 31, wherein said at least two annular reinforcing inserts are interposed between said at least two reinforcing elements.

43. The tyre as claimed in claim 31, wherein each of the two annular anchoring structures has at least three annular reinforcing inserts, at least two of said annular reinforcing inserts being interposed between said at least two reinforcing elements.

44. The tyre as claimed in claim 31, wherein two reinforcing elements lie at mutually opposite axial positions that are external to the annular reinforcing inserts and to the end portions of said at least one carcass ply.

45. The tyre as claimed in claim 31, wherein at least one of said reinforcing elements lies axially interposed between the end portions of said at least one carcass ply.

46. The tyre as claimed in claim 31, wherein at least one of said reinforcing elements lies axially interposed between the annular reinforcing inserts.

47. The tyre as claimed in claim 31, wherein at least one of the end portions of a carcass ply is turned up across at least one annular reinforcing insert.

48. The tyre as claimed in claim 31, wherein at least two of said reinforcing elements are disposed axially contiguous to each other.

49. The tyre as claimed in claim 34, wherein said cord has a diameter between about 0.2 mm and about 1 mm.

50. The tyre as claimed in claim 34, wherein said cord is alternatively made of steel, aluminium, aluminium alloy, or steel and aluminium.

51. The tyre as claimed in claim 34, wherein said cord has a coating selected from brass, zinc, zinc/manganese alloys, zinc/cobalt alloys, zinc/cobalt/manganese alloys.

52. The tyre as claimed in claim 34, wherein the reinforcing elements have a density between 40 cords/dm and 160 cords/dm.

53. The tyre as claimed in claim 22, wherein the reinforcing elements have a density between 70 cords/dm and 110 cords/dm.

54. The tyre as claimed in claim 34, wherein each cord comprises at least one pre-deformed wire.

55. The tyre as claimed in claim 54, wherein said pre-deformed wire has an undulated shape.

56. The tyre as claimed in claim 55, wherein said undulated shape is sinusoidal.

57. The tyre as claimed in claim 55, wherein said undulated shape is helical.

58. The tyre as claimed in claim 54, wherein said pre-deformed wire has a diameter between about 0.05 mm and about 0.25 mm.

59. The tyre as claimed in claim 54, wherein said pre-deformed wire is alternatively made of steel, aluminium, aluminium alloy, or steel and aluminium.

60. The tyre as claimed in claim 54, wherein said pre-deformed wire has a coating selected from brass, zinc, zinc/manganese alloys, zinc/cobalt alloys, and zinc/cobalt/manganese alloys.

61. The tyre as claimed in claim 31, wherein a ratio between a section height and a section width of said tyre is between about 0.25 and about 0.55.

62. The tyre for vehicle wheels comprising:
   a carcass structure comprising at least one carcass ply extending between two annular anchoring structures that are mutually spaced apart along an axial direction of the tyre, and having axially opposite end portions of said at least one carcass ply associated with the annular anchoring structures; a tread band circumferentially extended around said carcass structure; a belt structure circumferentially positioned between said carcass structure and tread band; and each of the two annular anchoring structures comprising at least two annular reinforcing inserts that are mutually and axially spaced apart and are each formed with at least one first elongated element laid into radially superposed coils, the end portion of said at least one carcass ply lying between two adjacent annular reinforcing inserts;
   wherein each of the two annular anchoring structures further comprises at least two reinforcing elements that are mutually spaced along the axial direction and each extending in a radial direction,
   wherein at least one of said annular anchoring structures has a first said reinforcing element comprising a metallic type elongated element and a second said reinforcing element comprising a metallic type elongated element.

63. The tyre for vehicle wheels comprising:
   a carcass structure comprising at least one carcass ply extending between two annular anchoring structures that are mutually spaced apart along an axial direction of the tyre, and having axially opposite end portions of said at least one carcass ply associated with the annular anchoring structures;
   a tread band circumferentially extended around said carcass structure;
   a belt structure circumferentially positioned between said carcass structure and tread band; and
   each of the two annular anchoring structures comprising at least two annular reinforcing inserts that are mutually and axially spaced apart and are each formed with at least one first elongated element laid into radially superposed coils, the end portion of said at least one carcass ply lying between two adjacent annular reinforcing inserts;
   wherein each of the two annular anchoring structures further comprises at least two reinforcing elements that are mutually spaced along the axial direction and each extending in a radial direction and comprising at least one second elongated element, said second elongated element of at least one reinforcing element being of the metallic type;
   and wherein within a first one of the annular anchoring structures, the cords of a first one of said reinforcing elements and the cords of a second one of said reinforcing elements are the same material, and the cords of the first one of said reinforcing elements delimit angles that are opposite to the angles delimited by the cords of the second one of said reinforcing elements.

64. The tyre as claimed in claim 62, wherein each metallic type elongated element delimits an angle between about 20° and about 70°, relative to a radial direction passing through a radially internal point of the metallic type elongated element.

65. The tyre as claimed in claim 64, wherein said angle is between 45° and 70°.

66. The tyre as claimed in claim 62, wherein each metallic type elongated element is a cord.

67. The tyre as claimed in claim 66, wherein each reinforcing element comprises a plurality of cords disposed in side by side relationship.

68. The tyre as claimed in claim 67, wherein the cords of at least one of said reinforcing elements delimit angles that are opposite to the angles delimited by the cords of the other reinforcing elements.

69. The tyre as claimed in claim 68, wherein the cords of at least one of said reinforcing elements delimit angles that are equal to and opposite to the angles delimited by the cords of the other reinforcing elements.

70. The tyre as claimed in claim 62, wherein an average value of a radial extension of the reinforcing elements is between about 25% and about 99% of a section height of the tyre.

71. The tyre as claimed in claim 70, wherein said average value is between about 30% and about 55% of the section height of the tyre.

72. The tyre as claimed in claim 62, wherein a ratio of a section height of a radially less extended reinforcing element to a section height of a radially more extended reinforcing element is between about 0.3 and 1.

73. The tyre as claimed in claim 72, wherein said ratio is between about 0.6 and about 0.9.

74. The tyre as claimed in claim 62, wherein in each annular anchoring structure, the end portion of at least one carcass ply is axially interposed between said at least two reinforcing elements.

75. The tyre as claimed in claim 62, wherein said at least two annular reinforcing inserts are interposed between said at least two reinforcing elements.

76. The tyre as claimed in claim 62, wherein each of the two annular anchoring structures has at least three annular reinforcing inserts, at least two of said annular reinforcing inserts being interposed between said at least two reinforcing elements.

77. The tyre as claimed in claim 62, wherein two reinforcing elements lie at mutually opposite axial positions that are external to the annular reinforcing inserts and to end portions of said at least one carcass ply.

78. The tyre as claimed in claim 62, wherein at least one of said reinforcing elements lies axially interposed between end portions of said at least one carcass ply.

79. The tyre as claimed in claim 62, wherein at least one of said reinforcing elements lies axially interposed between the annular reinforcing inserts.

80. The tyre as claimed in claim 62, wherein said at least two reinforcing elements are joined by a connecting portion so as to form a single reinforcing element, said connecting portion extending in a radially internal region relative to the annular reinforcing inserts and to the end portions of at least one carcass ply so as to define an encircling loop.

81. The tyre as claimed in claim 62, wherein at least one of the end portions of a carcass ply is turned up across at least one annular reinforcing insert.

82. The tyre as claimed in claim 62, wherein at least two of said reinforcing elements are disposed axially contiguous to each other.

83. The tyre as claimed in claim 66, wherein said cord has a diameter between about 0.2 mm and about 1 mm.

84. The tyre as claimed in claim 66, wherein said cord is alternatively made of steel, aluminum, aluminum alloy, or steel and aluminum.

85. The tyre as claimed in claim 66, wherein said cord has a coating selected from brass, zinc, zinc/manganese alloys, zinc/cobalt alloys, and zinc/cobalt/manganese alloys.

86. The tyre as claimed in claim 66, wherein the reinforcing elements have a density between 40 cords/dm and 160 cords/dm.

87. The tyre as claimed in claim 86, wherein the reinforcing elements have a density between 70 cords/dm and 110 cords/dm.

88. The tyre as claimed in claim 66, wherein each cord comprises at least one pre-deformed wire.

89. The tyre as claimed in claim 88, wherein said pre-deformed wire has an undulated shape.

90. The tyre as claimed in claim 89, wherein said undulated shape is sinusoidal.

91. The tyre as claimed in claim 89, wherein said undulated shape is helical.

92. The tyre as claimed in claim 88, wherein said pre-deformed wire has a diameter between about 0.05 mm and about 0.25 mm.

93. The tyre as claimed in claim 88, wherein said pre-deformed wire is alternatively made of steel, aluminum, aluminum alloy, or steel and aluminum.

94. The tyre as claimed in claim 88, wherein said pre-deformed wire has a coating selected from brass, zinc, zinc/manganese alloys, zinc/cobalt alloys, and zinc/cobalt/manganese alloys.

95. The tyre as claimed in claim 62, wherein a ratio between a section height and a section width of said tyre is between about 0.25 and about 0.55.

96. The tyre as claimed in claim 63, wherein each second elongated element delimits an angle between about 20° and about 70°, relative to a radial direction passing through a radially internal point of the second elongated element.

97. The tyre as claimed in claim 63, wherein said angle is between 45° and 70°.

98. The tyre as claimed in claim 63, wherein the cords of the first one of said reinforcing elements delimit angles that are equal and opposite to the angles delimited by the cords of the second one of said reinforcing elements.

99. The tyre as claimed in claim 63, wherein an average value of a radial extension of the reinforcing elements is between about 25% and about 99% of a section height of the tyre.

100. The tyre as claimed in claim 99, wherein said average value is between about 30% and about 55% of the section height of the tyre.

101. The tyre as claimed in claim 63, wherein a ratio of a section height of a radially less extended reinforcing element to a section height of a radially more extended reinforcing element is between about 0.3 and 1.

102. The tyre as claimed in claim 101, wherein said ratio is between about 0.6 and about 0.9.

103. The tyre as claimed in claim 63, wherein in each annular anchoring structure, the end portion of at least one carcass ply is axially interposed between said at least two reinforcing elements.

104. The tyre as claimed in claim 63, wherein said at least two annular reinforcing inserts are interposed between said at least two reinforcing elements.

105. The tyre as claimed in claim 63, wherein each of the two annular anchoring structures has at least three annular reinforcing inserts, at least two of said annular reinforcing inserts being interposed between said at least two reinforcing elements.

106. The tyre as claimed in claim 63, wherein two reinforcing elements lie at mutually opposite axial positions that are external to the annular reinforcing inserts and to end portions of said at least one carcass ply.

107. The tyre as claimed in claim 63, wherein at least one of said reinforcing elements lies axially interposed between end portions of said at least one carcass ply.

108. The tyre as claimed in claim 63, wherein at least one of said reinforcing elements lies axially interposed between the annular reinforcing inserts.

109. The tyre as claimed in claim 63, wherein said at least two reinforcing elements are joined by a connecting portion so as to form a single reinforcing element, said connecting portion extending in a radially internal region relative to the annular reinforcing inserts and to the end portions of at least one carcass ply so as to define an encircling loop.

110. The tyre as claimed in claim 63, wherein at least one of the end portions of a carcass ply is turned up across at least one annular reinforcing insert.

111. The tyre as claimed in claim 63, wherein at least two of said reinforcing elements are disposed axially contiguous to each other.

112. The tyre as claimed in claim 63, wherein each of said cords has a diameter between about 0.2 mm and about 1 mm.

113. The tyre as claimed in claim 63, wherein each of said cords of said first one of said reinforcing elements and each of said cords of said second one of said reinforcing elements is alternatively made of steel, aluminum, aluminum alloy, or steel and aluminum.

114. The tyre as claimed in claim 63, wherein each of said cords of said first one of said reinforcing elements and each of said cords of said second one of said reinforcing elements has a coating selected from brass, zinc, zinc/manganese alloys, zinc/cobalt alloys, and zinc/cobalt/manganese alloys.

115. The tyre as claimed in claim 63, wherein the reinforcing elements have a density between 40 cords/dm and 160 cords/dm.

116. The tyre as claimed in claim 115, wherein the reinforcing elements have a density between 70 cords/dm and 110 cords/dm.

117. The tyre as claimed in claim 63, wherein each cord comprises at least one pre-deformed wire.

118. The tyre as claimed in claim 63, wherein said pre-deformed wire has an undulated shape.

119. The tyre as claimed in claim 118, wherein said undulated shape is sinusoidal.

120. The tyre as claimed in claim 118, wherein said undulated shape is helical.

121. The tyre as claimed in claim 117, wherein said pre-deformed wire has a diameter between about 0.05 mm and about 0.25 mm.

122. The tyre as claimed in claim 117, wherein said pre-deformed wire is alternatively made of steel, aluminum, aluminum alloy, or steel and aluminum.

123. The tyre as claimed in claim 117, wherein said pre-deformed wire has a coating selected from brass, zinc, zinc/manganese alloys, zinc/cobalt alloys, and zinc/cobalt/manganese alloys.

124. The tyre as claimed in claim 63, wherein a ratio between a section height and a section width of said tyre is between about 0.25 and about 0.55.

* * * * *